(12) United States Patent
Lai et al.

(10) Patent No.: US 12,506,153 B2
(45) Date of Patent: Dec. 23, 2025

(54) COMPOSITION, NEGATIVE ELECTRODE AND A BATTERY EMPLOYING THE SAME

(71) Applicant: INDUSTRIAL TECHNOLOGY RESEARCH INSTITUTE, Hsinchu (TW)

(72) Inventors: Guan-Lin Lai, Qionglin Township (TW); Chi-Yang Chao, Taipei (TW); Ting-Ju Yeh, Taipei (TW); Chi-Ju Cheng, Zhudong Township (TW); Guan-Fu Liu, Keelung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 10 days.

(21) Appl. No.: 18/458,869

(22) Filed: Aug. 30, 2023

(65) Prior Publication Data

US 2024/0258525 A1    Aug. 1, 2024

(30) Foreign Application Priority Data

Dec. 27, 2022    (TW) .................................. 111150071

(51) Int. Cl.
*H01M 4/62* (2006.01)
*H01M 4/04* (2006.01)
*H01M 4/02* (2006.01)

(52) U.S. Cl.
CPC .......... *H01M 4/622* (2013.01); *H01M 4/0404* (2013.01); *H01M 4/625* (2013.01); *H01M 2004/027* (2013.01)

(58) Field of Classification Search
CPC ..... H01M 4/622; H01M 4/0404; H01M 4/625
(Continued)

(56) References Cited

U.S. PATENT DOCUMENTS 5,229,504 A    7/1993    Hayashi
5,378,828 A    1/1995    Usher et al.
(Continued)

FOREIGN PATENT DOCUMENTS

CN    1126260 A    7/1996
CN    101465425 A    6/2009
(Continued)

OTHER PUBLICATIONS

TWI788147 B mach. trans. (Year: 2022).*
(Continued)

*Primary Examiner* — Jonathan G Leong
*Assistant Examiner* — John S Medley
(74) *Attorney, Agent, or Firm* — Birch, Stewart, Kolasch & Birch, LLP (57) ABSTRACT

A polymer, a composition, a negative electrode and a battery employing the same are provided. The polymer has a repeat unit represented by Formula (I)

Formula (I)

wherein $R^1$ is hydrogen or acetyl group; and, each $R^2$ is independently hydrogen, $-SO_3H$, or $-SO_3Li$, and at least one of $R^2$ is $-SO_3Li$.

16 Claims, 1 Drawing Sheet

(58) Field of Classification Search
USPC .......................................................... 429/217
See application file for complete search history.

(56) References Cited

U.S. PATENT DOCUMENTS

| | | | |
|---|---|---|---|
| 5,522,967 | A | 6/1996 | Shet |
| 9,077,014 | B2 | 7/2015 | Yeung et al. |
| 10,434,463 | B2 | 10/2019 | Kim et al. |
| 2015/0259571 | A1 | 9/2015 | Casasanta, III |
| 2016/0036056 | A1* | 2/2016 | Chung .................. H01M 4/134 252/182.1 |
| 2019/0173086 | A1* | 6/2019 | Oh ......................... H01M 50/44 |
| 2019/0229337 | A1* | 7/2019 | Saito .................... C08F 293/005 |

FOREIGN PATENT DOCUMENTS

| | | | | |
|---|---|---|---|---|
| CN | 108075112 | A | * 5/2018 | ........ H01M 10/0525 |
| CN | 108484795 | A | 9/2018 | |
| CN | 109920954 | A | 6/2019 | |
| CN | 112142862 | A | 12/2020 | |
| CN | 113462032 | A | 10/2021 | |
| CN | 116169430 | A | * 5/2023 | .......... H01M 10/052 |
| JP | 2009-277660 | A | 11/2009 | |
| TW | I328565 | B | 8/2010 | |
| TW | I406445 | B | 8/2013 | |
| TW | I788147 | B | 12/2022 | |
| WO | WO 2020/184125 | A1 | 9/2020 | |
| WO | WO-2024003155 | A1 | * 1/2024 | ................ C08L 5/08 |

OTHER PUBLICATIONS

Hamza et al., Sulfonation of Chitosan for Enhanced Sorption of Li(I) from Acidic Solutions—Application to Metal Recovery from Waste Li-ion Mobile Battery, Aug. 22, 2022, Chemical Engineering Journal, 441, all (Year: 2022).*
Taiwanese Office Action and Search Report for Taiwanese Application No. 111150071, dated Oct. 19, 2023.
Cao et al., "Rational Design of a Multifunctional Binder for High-Capacity Silicon-Based Anodes", ACS Energy Lett., 2019, vol. 4, pp. 1171-1180.
Gendensuren et al., "Sulfonation of alginate grafted with polyacrylamide as a potential binder for high-capacity Si/C anodes", RSC Adv., 2020, 10, pp. 37898-37904.
Yi et al., "A robust aqueous-processable polymer binder for long-life, high-performance lithium sulfur battery", Energy Storage Materials, 2019, vol. 21, pp. 61-68.
Yu et al., "Ionic/electronic conductivity regulation of n-type polyoxadiazole lithium sulfonate conductive polymer binders for high-performance silicon microparticle anodes", Chinese Chemical Letters, 2021, vol. 32, pp. 203-209.
Japanese Office Action for Japanese Application No. 2023-214852, dated Oct. 8, 2024, with English translation.

* cited by examiner

COMPOSITION, NEGATIVE ELECTRODE AND A BATTERY EMPLOYING THE SAME

CROSS REFERENCE TO RELATED APPLICATIONS

This application claims priority of Taiwan Patent Application No. 111150071, filed on Dec. 27, 2022, the entirety of which is incorporated by reference herein.

TECHNICAL FIELD

The disclosure relates to a polymer, composition, negative electrode and battery employing the same.

BACKGROUND

Lithium-ion secondary batteries are mainstream commercial products, and they are presently being developed to be lightweight, low-volume, and safer, and to have a higher energy capacity and a longer life cycle.

Carbon materials are widely used as the active substance in the negative electrode of lithium batteries. In order to further increase battery capacity, lithium batteries have gradually developed in the direction of using silicon-containing materials as the active substance in the negative electrode. However, when silicon-containing materials are used as the active substance in the negative electrode, the battery has a lower Coulombic efficiency. In addition, the phenomenon of volume swelling in silicon-containing materials significantly affects the life cycle of lithium batteries, resulting in a major obstacle to the application of silicon-containing materials in the negative electrode of lithium batteries.

SUMMARY

According to embodiments of the disclosure, the disclosure provides a polymer, composition, negative electrode and battery employing the same. The polymer has the repeating unit of Formula (I):

Formula (I)

wherein $R^1$ is hydrogen or acetyl group; and, $R^2$ are independently hydrogen, —$SO_3H$, or —$SO_3Li$, and at least one of $R^2$ is —$SO_3Li$.

According to embodiments of the disclosure, the disclosure also provides a composition. The composition includes Component (A) and Component (B). Component (A) includes Polymer (A-1) (having the repeating unit of Formula (I)) of the disclosure. Component (B) is a binder. Herein, the weight ratio of Component (A) to Component (B) may be 1:1 to 1:9.

According to embodiments of the disclosure, the disclosure also provides a negative electrode. The negative electrode includes a negative electrode active layer, wherein the negative electrode active layer is a product of the composition of the disclosure.

According to embodiments of the disclosure, the disclosure also provides a battery. The battery includes the negative electrode of the disclosure, a separator, and a positive electrode, wherein the negative electrode is separated from the positive electrode via the separator.

BRIEF DESCRIPTION OF THE DRAWINGS

The present invention can be more fully understood by reading the subsequent detailed description and examples with references made to the accompanying drawings, wherein.

DETAILED DESCRIPTION OF DISCLOSED EMBODIMENTS

The polymer, composition, negative electrode and battery employing the same of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. As used herein, the term "about" in quantitative terms refers to plus or minus an amount that is general and reasonable to persons skilled in the art.

It should be noted that the elements or devices in the drawings of the disclosure may be present in any form or configuration known to those skilled in the art. In addition, the expression "a layer overlying another layer", "a layer is disposed above another layer", "a layer is disposed on another layer", and "a layer is disposed over another layer" may refer to a layer that directly contacts the other layer, and they may also refer to a layer that does not directly contact the other layer, there being one or more intermediate layers disposed between the layer and the other layer.

The drawings described are only schematic and are non-limiting. In the drawings, the size, shape, or thickness of some of the elements may be exaggerated and not drawn on scale for illustrative purposes. The dimensions and the relative dimensions do not correspond to actual location to practice of the disclosure. The disclosure will be described with respect to particular embodiments and with reference to certain drawings but the disclosure is not limited thereto.

The disclosure provides a polymer, composition (such as a composition of negative electrode active layer), negative electrode (such as negative electrode of lithium battery) and battery employing the same (such as lithium battery). According to embodiments of the disclosure, since the polymer of the disclosure has a lithium sulfonate group, the polymer may react with a compound having hydroxyl group or a silicon-containing compound. Due to the addition of the polymer of the disclosure, the composition of the disclosure can form a structure that has lithium replenishment functionality and high mechanical strength, thereby enhancing the stability of the negative electrode's active layer and inhibiting the occurrence of volume swelling in the negative electrode during charging and discharging. As a result, the efficiency and life cycle of the battery can be improved.

According to embodiments of the disclosure, the polymer of the disclosure may have the repeating unit of Formula (I):

Formula (I)

wherein $R^1$ may be hydrogen or acetyl group; and $R^2$ may be independently hydrogen, —SO$_3$H, or —SO$_3$Li, and at least one of $R^2$ is —SO$_3$Li. According to embodiments of the disclosure, the polymer of the disclosure may have at least one the repeating unit of Formula (I).

According to embodiments of the disclosure, the repeating unit of Formula (I) may be wherein $R^1$ may be hydrogen or acetyl group.

According to embodiments of the disclosure, the repeating unit of Formula (I) may be wherein $R^2$ may be independently hydrogen, —SO$_3$H, or —SO$_3$Li, and at least one of $R^2$ is —SO$_3$Li.

According to embodiments of the disclosure, the repeating unit of Formula (I) may be According to embodiments of the disclosure, the polymer of the disclosure may have a weight average molecular weight (Mw) is between about 100,000 g/mol to 900,000 g/mol (such as 150,000 g/mol, 200,000 g/mol, 300,000 g/mol, 500,000 g/mol, 700,000 g/mol, or 800,000 g/mol). The weight average molecular weight (Mw) of the oligomer or polymer of the disclosure can be determined by gel permeation chromatography (GPC) (based on a polystyrene calibration curve).

According to embodiments of the disclosure, the method for preparing the polymer having the repeating unit of Formula (I) of the disclosure may include following steps. First, a chitosan is provided. Next, the chitosan reacts with a chlorosulfonic acid to undergo a sulfonation, obtaining a chitosan having sulfo group. Next, the chitosan having sulfo group reacts with a lithium hydroxide, obtaining the polymer having the repeating unit of Formula (I).

According to embodiments of the disclosure, the disclosure also provides a composition (such as binder composition). According to embodiments of the disclosure, the composition may include Component (A) and Component (B). Component (A) may include Polymer (A-1) (having the repeating unit of Formula (I)) of the disclosure. The Component (B) may be an binder. According to embodiments of the disclosure, the weight ratio of Component (A) to Component (B) may be about 1:1 to 1:9, such as 1:2, 1:3, 1:4, 1:5, 1:6, 1:7, or 1:8. When the weight ratio of Component (A) to Component (B) is within the above range, the composition of the disclosure exhibits superior adhesive capacity.

According to another embodiment of the disclosure, Component (A) may consist of Polymer (A-1) (having the repeating unit of Formula (I)) of the disclosure.

According to embodiments of the disclosure, in order to increase the adhesive capacity of the composition, Component (A) may further include carboxymethyl cellulose (CMC) (A-2). According to another embodiment of the disclosure, Component (A) may be a combination of the polymer of the disclosure (A-1) and the carboxymethyl cellulose (CMC) (A-2). Namely, Component (A) may consist of the polymer of the disclosure (A-1) and the carboxymethyl cellulose (CMC) (A-2).

According to embodiments of the disclosure, the weight ratio of Polymer (A-1) to carboxymethyl cellulose (CMC) (A-2) may be about 99:1 to 1:19, such as 95:1, 90:1, 85:1, 80:1, 75:1, 70:1, 65:1, 60:1, 55:1, 50:1, 45:1, 40:1, 35:1, 30:1, 25:1, 20:1, 15:1, 10:1, 5:1, 1:1, 1:2, 1:3, 1:4, 1:5, 1:6, 1:7, 1:8, 1:9, 1:10, or 1:15. According to embodiments of the disclosure, the polymer of the disclosure may react with methyl cellulose to form a network structure.

According to embodiments of the disclosure, the binder (i.e. Component (B)) may be polyvinyl alcohol (PVA), polytetrafluoroethylene (PTFE), polyvinylidene fluoride (PVDF), poly(styrene-co-butadiene), fluorine rubber, polyurethane, polyvinylpyrrolidone, polyvinyl carbonate, polyvinyl chloride, polyacrylonitrile (PAN), polybutadiene, poly(acrylic acid) (PAA), perfluoroalkoxy alkane (PFA), fluorinated ethylene propylene (FEP), polyvinylidene fluoride-co-hexafluoropropylene (PVDF-HFP), styrene-butadiene rubber (SBR), acrylic resin, polyethylene glycol (PEG), poly(ethylene oxide) (PEO), or a combination thereof. According to embodiments of the disclosure, the binder of the disclosure may have a weight average molecular weight (Mw) about 100,000 g/mol to 9,000,000 g/mol (such as 200,000 g/mol, 300,000 g/mol, 500,000 g/mol, 700,000 g/mol, 1,000,000 g/mol, 1,300,000 g/mol, 1,500,000 g/mol, 2,000,000 g/mol, 32,000,000 g/mol, 4,000,000 g/mol, 5,000,000 g/mol, 6,000,000 g/mol, 7,000,000 g/mol, or 8,000,000 g/mol). The weight average molecular weight (Mw) of the binder of the disclosure can be determined by gel permeation chromatography (GPC) (based on a polystyrene calibration curve).

According to embodiments of the disclosure, the composition may further include Component (C), wherein Component (C) may be negative electrode active material. According to embodiments of the disclosure, the negative electrode active material may be carbon material, lithium, transition metal oxide, lithium-containing compound, silicon-containing material, or a combination thereof. According to embodiments of the disclosure, the carbon material may include metastable phase spherical carbon (MCMB), vapor grown carbon fiber (VGCF), carbon nanotube (CNT), coke, carbon black, graphite, graphene, acetylene black, carbon fiber, or a combination thereof. According to embodiments of the disclosure, the lithium-containing compound may include LiAl, LiMg, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, or $Li_{2.6}Cu_{0.4}N$. According to embodiments of the disclosure, the silicon-containing material may include carbon-modified silicon oxide, silicon carbide, or pure-silicon material. According to embodiments of the disclosure, the transition metal oxide may include $Li_4Ti_5O_{12}$ or $TiNb_2O_7$. According to embodiments of the disclosure, the ratio of the total weight of Component (A) and Component (B) to the weight of Component (C) may be about 1:5 to 1:15, such as 1:6, 1:7, 1:8, 1:9, 1:10, or 1:13.

According to embodiments of the disclosure, the composition may further include Component (D), wherein Component (D) is a conductive material. According to embodiments of the disclosure, the conductive material may be conductive carbon black, conductive graphite, fluorocarbon, reduced graphene, nitrogen-doped graphite, nitrogen-doped graphene, carbon fiber, carbon nanotube, or a combination thereof. According to embodiments of the disclosure, the ratio of the total weight of Component (A) and Component (B) to the weight of Component (D) may be 1:1 to 1:9, such as 1:2, 1:3, 1:4, 1:5, 1:6, 1:7, or 1:8.

According to embodiments of the disclosure, the composition of the disclosure may be a negative electrode active layer composition for preparing the negative electrode active layer, serving as the negative electrode of battery. The composition may include Component (A), Component (B), Component (C), and Component (D). According to embodiments of the disclosure, the composition may include about 0.1 wt % to 6 wt % (such as 0.2 wt %, 0.3 wt %, 0.5 wt %, 1 wt %, 2 wt %, 3 wt %, 4 wt %, 5 wt %, or 5.5 wt %) of Component (A), 1 wt % to 10 wt % (such as 2 wt %, 3 wt %, 5 wt %, 1 wt %, 2 wt %, 3 wt %, 4 wt %, 5 wt %, 6 wt %, 7 wt %, 8 wt %, or 9 wt %) of Component (B), 65 wt % to 90 wt % (such as 70 wt %, 75 wt %, 80 wt %, 82 wt %, or 84 wt %) of Component (C), and 1 wt % to 20 wt % (such as 2 wt %, 3 wt %, 5 wt %, 1 wt %, 2 wt %, 3 wt %, 4 wt %, 5 wt %, 6 wt %, 7 wt %, 8 wt %, 9 wt %, 10 wt %, 12 wt %, 15 wt %, 17 wt %, 18 wt %, or 19 wt %) of Component (D), based on the total weight of Component (A), Component (B), Component (C), and Component (D).

According to another embodiment of the disclosure, the composition may consist of Component (A), Component (B), Component (C) and Component (D).

According to embodiments of the disclosure, a protective layer (formed from Component (A) and Component (B)) with high adhesivity is formed on the surface of Component (C), so that the surface flatness of the negative electrode during charging and discharging could be enhanced and the formation of metal dendrites could be inhibited or reduced. As a result, the performance and lifespan of batteries (such as lithium batteries) would be improved. In addition, when Component (C) is a silicon-containing material, Component (A) can react with the silicon-containing material to achieve a compact encapsulation of the silicon-containing material and withstand the stress generated during charging and discharging, thereby avoiding the phenomenon of volume swelling in the silicon-containing material during charging and discharging. This serves the purpose of improving the life cycle of silicon-based negative electrodes.

According to embodiments of the disclosure, when Component (A) consists of the polymer and methyl cellulose, a network structure may be formed to cover the surface of Component (C).

According to embodiments of the disclosure, the composition further comprising Component (E), and Component (A), Component (B), Component (C) and Component (D) are uniformly dispersed in the Component (E) to form a slurry (applied in coating process), thereby completely mixing Component (A), Component (B), Component (C) and Component (D). According to embodiments of the disclosure, Component (E) may be water, ethylene glycol dimethyl ether (DME), 1-methyl-2-pyrrolidinone (NMP), N, N-dimethylformamide (DMF), N, N-dimethylacetamide (DMAc), pyrrolidone, N-dodecylpyrrolidone, γ-butyrolactone, or a combination thereof. According to embodiments of the disclosure, when the composition includes Component (E), the composition has a solid content may be about 5 wt % to 30 wt %, such as 6 wt %, 10 wt %, 15 wt %, 20 wt %, or 25 wt %. Herein, the solid content means a weight percentage of the components of the composition except Component (E), based on the total weight of the composition.

According to another embodiment of the disclosure, the composition may consist of Component (A), Component (B), Component (C), Component (D), and Component (E).

According to embodiments of the disclosure, due to the specific components and content of the disclosure, the negative electrode prepared from the composition has a function of lithium replenishment and a structure with high mechanical strength, thereby enhancing the stability of negative electrode, inhibiting the occurrence of volume swelling in the negative electrode and improving the efficiency and life cycle of the battery.

Figure 1:
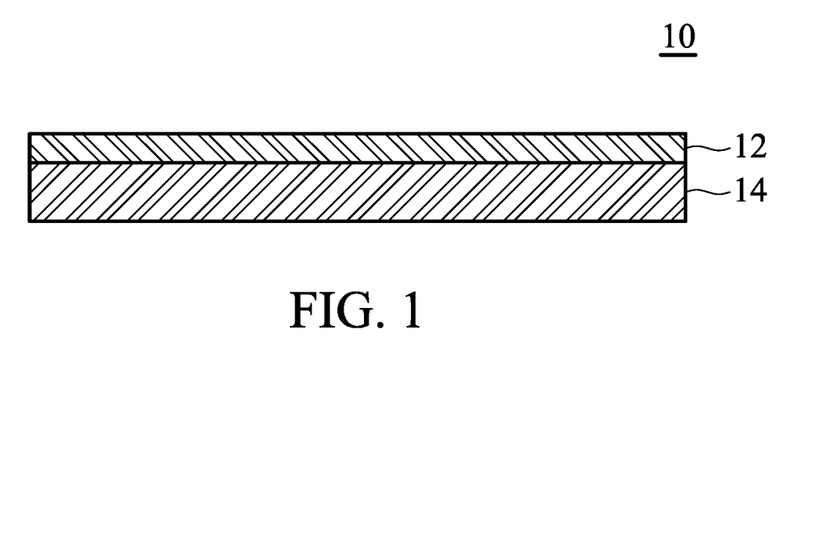
FIG. 1 is a cross-sectional view of the negative electrode of the battery according to embodiments of the disclosure.

According to embodiments of the disclosure, the disclosure provides a negative electrode serving as negative electrode of battery (such as negative electrode of lithium battery). According to embodiments of the disclosure, as shown in FIG. 1, the negative electrode 10 of the disclosure may include a negative electrode active layer 12. According to embodiments of the disclosure, the negative electrode active layer 12 may be a product of the composition of the disclosure after mixing or reacting. According to embodiments of the disclosure, the thickness of the active layer 12 of the negative electrode of the disclosure is not limited and may be optionally modified by a person of ordinary skill in the field. For example, the thickness of the negative electrode active layer 12 may be about 1 μm to 1,000 μm (such as about 5 μm, 10 μm, 50 μm, 100 μm, 200 μm, 300 μm, 400 μm, 500 μm, 600 μm, 700 μm, 800 μm, or 900 μm).

In addition, as shown in FIG. 1, the negative electrode 10 may further include a negative electrode current-collecting layer 14, wherein the negative electrode active layer 12 is disposed on the current-collecting layer 14 of the negative electrode. According to embodiments of the disclosure, the thickness of the negative electrode current-collecting layer 14 is not limited and may be optionally modified by a person of ordinary skill in the field. For example, the thickness of the negative electrode current-collecting layer 16 may be about 100 μm to 5,000 μm (such as about 200 μm, 300 μm, 400 μm, 500 μm, 600 μm, 700 μm, 800 μm, 900 μm, 1,000 μm, 2,000 μm, 3,000 μm, or 4,000 μm). According to embodiments of the disclosure, the negative electrode current-collecting layer 14 may be a conductive carbon substrate, metal foil, or metal material with a porous structure, such as carbon cloth, carbon felt, carbon paper, copper foil, nickel foil, aluminum foil, nickel mesh, copper mesh, molybdenum mesh, nickel foam, copper foam, or molybdenum foam. According to embodiments of the disclosure, the metal material with a porous structure may have a porosity about 10% to 99.9% (such as about 20%, 30%, 40%, 50%, 60%, 70%, 80% or 90%).

According to another embodiment of the disclosure, the negative electrode 10 may consist of the negative electrode active layer 12. According to another embodiment of the disclosure, the negative electrode 10 may consist of the negative electrode active layer 12 and the negative electrode current-collecting layer 14.

According to embodiments of the disclosure, the method for preparing the negative electrode 10 as shown in FIG. 1 may include following steps. First, a negative electrode current-collecting layer (such as copper foil) 14 is provided. Next, Component (A), Component (B), Component (C) and Component (D) are uniformly dispersed in Component (E) (i.e. solvent) for a period of time (about 30 minutes to 6 hours, such as 1 hour, 2 hours, 3 hours, or 5 hours), obtaining the composition of the disclosure (serving as negative electrode active layer slurry). Next, the composition is coated on the surface of the negative electrode current-collecting layer 14 to form a coating via a coating process. Next, the coating is subjected to a rolling process (with a compression ratio of about 15% to 70%, such as 20%, 30%, 40%, 50%, or 60%) and a drying process (at a temperature of 90° C. to 180° C. (such as 100° C., 120° C., or 150° C.) for 30 minutes to 18 hours (such as 1 hour, 3 hours, 5 hours, 6 hours, 8 hours, 10 hours, 12 hours, or 15 hours)), obtaining the negative electrode active layer 12. The coating process may be screen printing, spin coating, bar coating, blade coating, roller coating, solvent casting, or dip coating.

Figure 2:
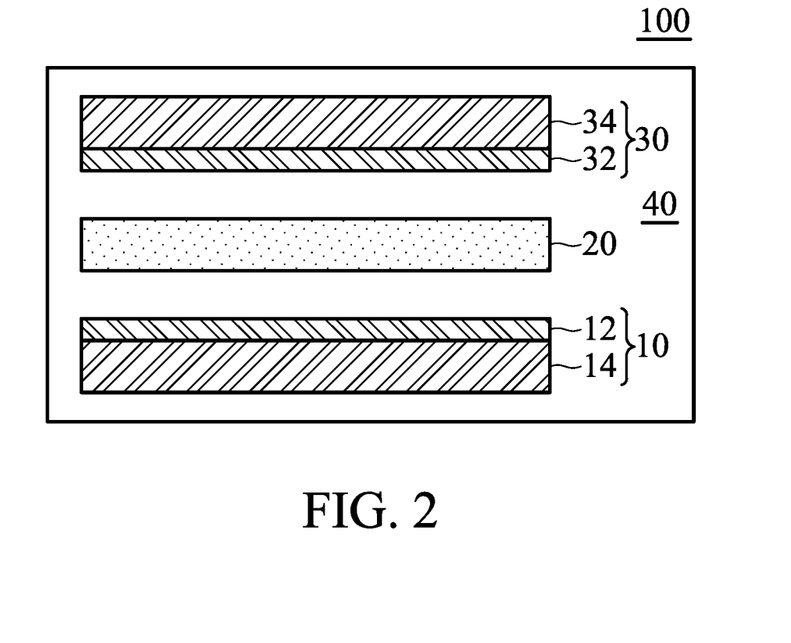
FIG. 2 is a cross-sectional view of the battery according to an embodiment of the disclosure.

According to embodiments of the disclosure, As shown in FIG. 2, the disclosure also provides a battery 100, such as lithium battery, lithium ion battery, or lithium metal battery. The battery 100 includes the negative electrode 10 as shown in FIG. 1, a separator 20, and a positive electrode 30. wherein, the negative electrode 10 is separated from the positive electrode 30 by the separator 20. According to embodiments of the disclosure, the positive electrode 30 may directly contact the separator 20, and/or the negative electrode 10 may directly contact the separator 20. According to embodiments of the disclosure, the positive electrode 30 may be separated from the separator 20 by a specific distance, and/or the negative electrode 10 may be separated from the separator 20 by a specific distance. According to embodiments of the disclosure, the battery 100 may further include a liquid electrolyte 40, and the liquid electrolyte is disposed between the negative electrode 10 and positive electrode 30. Namely, the structure stacked by the negative electrode 10, separator 20, and positive electrode 30 is immersed in the liquid electrolyte 40. Namely, the battery 100 is filled with the liquid electrolyte 40. According to some embodiments of the disclosure, the negative electrode active layer 12 of the disclosure may be disposed between the separator 20 and the negative electrode current-collecting layer 14. According to embodiments of the disclosure, the battery 100 of the disclosure may consist of the negative electrode 10, the separator 20, the positive electrode 30, and the liquid electrolyte 40.

According to embodiments of the disclosure, the separator 20 may include insulating material, such as polyethylene (PE), polypropylene (PP), polytetrafluoroethylene (PTFE), polyamide, polyvinylchloride (PVC), poly(vinylidene fluoride), polyaniline, polyimide, polyethylene terephthalate, polystyrene (PS), ceramic material, or a combination thereof. For example, the separator 20 may be multilayer composite structure. According to embodiments of the disclosure, the separator may have a porous structure. Namely, the pores of the separator are uniformly distributed among the whole separator.

According to embodiments of the disclosure, the liquid electrolyte 40 may include a solvent and a lithium salt (or lithium-containing compound). According to embodiments of the disclosure, since the negative electrode active material (i.e. Component (C)) is encapsulated by a protective layer (prepared from Component (A) and Component (B)). The protective layer prevents direct contact between the negative electrode active material and the liquid electrolyte, thereby reducing the decomposition of the liquid electrolyte and improving the cycling performance of the battery.

According to embodiments of the disclosure, the liquid electrolyte 40 of the disclosure is not limited and may be conventional liquid electrolyte used in the lithium battery. According to embodiments of the disclosure, the concentration of the lithium salt in the solvent may be about 0.8M to 1.6M, such as about 0.9M, 1.0M, 1.1M, 1.2M, 1.3M, 1.4M, or 1.5M. According to embodiments of the disclosure, the solvent may be organic solvent, such as ester solvent, ketone solvent, carbonate solvent, ether solvent, alkane solvent, amide solvent, or a combination thereof. According to embodiments of the disclosure, the solvent may be 1,2-diethoxyethane, 1,2-dimethoxyethane, 1,2-dibutoxyethane, tetrahydrofuran (THF), 2-methyl tetrahydrofuran, dimethylacetamide (DMAc), 1-methyl-2-pyrrolidinone (NMP), methyl acetate, ethyl acetate, methyl butyrate, ethyl butyrate, methyl propionate, ethyl propionate, propyl acetate (PA), γ-butyrolactone (GBL), ethylene carbonate (EC), propylene carbonate (PC), diethyl carbonate (DEC), ethylmethyl carbonate (EMC), dimethyl carbonate (DMC), vinylene carbonate, butylene carbonate, dipropyl carbonate, fuoroethylene carbonate, 1,3-propane sultone, or a combination thereof. According to embodiments of the disclosure, the lithium salt may be lithium hexafluorophosphate ($LiPF_6$), lithium perchlorate (lithium perchlorate (LiClO4), bis(fluorosulfonyl)imide lithium ($LiN(SO_2F)_2$) (LiFSI), lithium difluoro(oxalato)borate ($LiBF_2(C_2O_4)$) (LiDFOB), lithium tetrafluoroborate ($LiBF_4$), lithium trifluoromethanesulfonate ($LiSO_3CF_3$), bis(trifluoromethane)sulfonimide lithium ($LiN(SO_2CF_3)_2$) (LiTFSI), lithium bis perfluoroethanesulfonimide ($LiN(SO_2CF_2CF_3)_2$), lithium hexafluoroarsenate ($LiAsF_6$), lithium Hexafluoroantimonate ($LiSbF_6$), lithium tetrachloroaluminate ($LiAlCl_4$), lithium tetrachlorogallate ($LiGaCl_4$), lithium nitrate ($LiNO_3$), tris(trifluoromethanesulfonyl)methyllithium ($LiC(SO_2CF_3)_3$), lithium thiocyanate hydrate (LiSCN), $LiO_3SCF_2CF_3$, $LiC_6F_5SO_3$, $LiO_2CCF_3$, lithiumfluorosulfonate ($LiSO_3F$), lithium tetrakis(pentafluorophenyl)borate ($LiB(C_6H_5)_4$), lithium bis(oxalato)borate ($LiB(C_2O_4)_2$) (LiBOB), or a combination thereof.

According to embodiments of the disclosure, the positive electrode 30 may include a positive electrode active layer 32 and a positive electrode current-collecting layer 34, and the positive electrode active layer 32 disposed on the positive electrode current-collecting layer 34, wherein the positive electrode active layer 32 includes a positive electrode active material.

According to embodiments of the disclosure, the positive electrode active material may be sulfur, organic sulfide, sulfur-carbon composite, metal-containing lithium oxide, metal-containing lithium sulfide, metal-containing lithium selenide, metal-containing lithium telluride, metal-containing lithium silicide, metal-containing lithium boride, or a combination thereof, wherein the metal is selected from a group consisting of aluminum, vanadium, titanium, chromium, copper, molybdenum, niobium, iron, nickel, cobalt, and manganese. According to embodiments of the disclosure, the positive electrode material may be lithium cobalt oxide, lithium nickel oxide, lithium manganese oxide, lithium cobalt manganese oxide, lithium nickel cobalt oxide, lithium nickel manganese oxide, lithium-nickel-manganese-cobalt oxide, lithium-chromium-manganese oxide, lithium-nickel-vanadium oxide, lithium-manganese-nickel oxide, lithium-cobalt-vanadium oxide, lithium-nickel-cobalt-aluminum oxide, lithium iron phosphate, or a combination thereof.

According to embodiments of the disclosure, lithium-nickel-manganese-cobalt oxide of the disclosure may have a structure of $LiNi_xCo_yMn_zO_2$, wherein $0<x<1$, $0<y<1$, $0<z<1$, and $x+y+z=1$. According to embodiments of the disclosure, lithium-nickel-cobalt-aluminum oxide of the disclosure may have a structure of $LiNi_{0.80}Co_{0.15}Al_{0.05}O_2$. According to embodiments of the disclosure, lithium cobalt oxide of the disclosure may be $LiCoO_2$.

According to embodiments of the disclosure, the positive electrode active layer 32 may further include an binder. According to embodiments of the disclosure, in the positive electrode active layer 32, the weight ratio of the binder to the positive electrode active material may be 0.1:99.9 to 10:90 (such as 1:99, 2:98, 3:97, 4:96, 5:95, 6:94, 7:93, 8:92, or 9:91).

According to embodiments of the disclosure, the binder may include polyvinyl alcohol (PVA), polytetrafluoroethylene (PTFE), carboxymethyl cellulose (CMC), polyvinylidene fluoride (PVDF), styrene-butadiene copolymer, fluorinated rubber, polyurethane, polyvinyl pyrrolidone, poly(ethyl acrylate), polyvinylchloride (PVC), polyacrylonitrile (PAN), polybutadiene, polyacrylic acid (PAA, or a combination thereof. According to embodiments of the disclosure, the positive electrode active layer 32 may further include a conductive additive, wherein conductive additive may be conductive carbon black, conductive graphite, fluorocarbon, reduced graphene, nitrogen-doped graphite, nitrogen-doped graphene, carbon fiber, carbon nanotube, or a combination thereof. According to embodiments of the disclosure, in the positive electrode active layer 32, the weight ratio of the conductive additive to the positive electrode active material may be 0.1:99.9 to 10:90 (such as 1:99, 2:98, 3:97, 4:96, 5:95, 6:94, 7:93, 8:92, or 9:91). According to another embodiment of the disclosure, the positive electrode active layer 32 may consist of the positive electrode active material and the binder. According to another embodiment of the disclosure, the positive electrode active layer 32 may consist of the binder, conductive additive, and the positive electrode active material.

According to embodiments of the disclosure, the positive electrode current-collecting layer 34 may be conductive carbon substrate, metal foil, or metal material with a porous structure, such as carbon cloth, carbon felt, carbon paper, copper foil, nickel foil, aluminum foil, nickel mesh, copper mesh, molybdenum mesh, nickel foam, copper foam, or molybdenum foam. According to embodiments of the disclosure, the metal material with a porous structure may have a porosity about 10% to 99.9% (such as about 60% or 70%).

According to embodiments of the disclosure, the positive electrode active layer 32 of the disclosure may be disposed between the separator 20 and the positive electrode current-collecting layer 34.

According to embodiments of the disclosure, the thickness of the positive electrode active layer 32 is not limited and may be optionally modified by a person of ordinary skill in the field, For example, the thickness of the positive electrode active layer 32 may be about 1 μm to 1,000 μm (such as about 5 μm, 10 μm, 50 μm, 100 μm, 200 μm, 300 μm, 400 μm, 500 μm, 600 μm, 700 μm, 800 μm, or 900 μm). According to embodiments of the disclosure, the thickness of the positive electrode current-collecting layer 34 is not limited and may be optionally modified by a person of ordinary skill in the field. For example, the thickness of the positive electrode current-collecting layer 34 may be about 100 μm to 5,000 μm (such as about 200 μm, 300 μm, 400 μm, 500 μm, 600 μm, 700 μm, 800 μm, 900 μm, 1,000 μm, 2,000 μm, 3,000 μm, or 4,000 μm).

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLE

Preparation of Polymer

Example 1

Chlorosulfonic acid (12 mL) and concentrated sulfuric acid (with a concentration of 17.9M, 40 mL) were mixed at 0° C., obtaining a mixture. Next, chitosan (with a molecular weight of about 300,000) (CAS:9012-76-4, commercially available from sigma-aldrich) was added into the mixture at 0° C., wherein the equivalence ratio of chitosan to chlorosulfonic acid was about 3:1. Next, the result was reacted at room temperature (25° C.) for 1 hour. Next, the result was added into ethyl ether to precipitate a solid. After filtration, the filtered cake was dissolved in deionized water. After filtration, the result was titrated with lithium hydroxide aqueous solution (concentration is 1M) to neutrality. Finally, the solution was subjected to a three-day dialysis using a dialysis membrane (Cellu-Sep T4) to remove residual sulfonic ions. After dialysis, the solution was freeze-dried using a freeze dryer (FD-8510T) under low temperature and low pressure, allowing water to sublime directly, Polymer (1) was obtained.

The measurement results of nuclear magnetic resonance spectrometry of Polymer (1) are shown below: $^1$H NMR (600 MHz, CDCl$_3$): 4.92-5.10 (H-1), 4.50-4.11 (H-3,4,5), 4.11-3.45 (H-6), 3.22-2.80 (H-2).

Preparation of Negative Electrode Active Layer Composition

Example 2

80.7 parts by weight of SiO/C (mixture of silicon oxide and carbon) (commercially available from Kaijin New Energy Technology Co., Ltd. with a trade designation of KYX-2), 12.6 parts by weight of conductive carbon black (with a trade number of Super-P, commercially available from Timcal), 2.9 parts by weight of Polymer (1), and 3.8 parts by weight of polyacrylic acid (PAA) were mixed and uniformly dispersed (at least 4 hours) in deionized water (22.5 wt % of solid and 77.5 wt % of deionized water), obtaining Negative electrode active layer composition (1).

Example 3

78.9 parts by weight of SiO/C (mixture of silicon oxide and carbon) (commercially available from Kaijin New Energy Technology Co., Ltd. with a trade designation of KYX-2), 12.3 parts by weight of conductive carbon black (with a trade number of Super-P, commercially available from Timcal), 0.5 parts by weight of Polymer (1), 4.5 parts by weight of carboxymethyl cellulose (CMC) (with a trade number of CMC-2200, commercially available from Daicel Chemical industries), and 3.8 parts by weight of styrene-butadiene rubber (SBR) (with a trade number of Nippon A&L 307R, commercially available from Cino Group or S-insight technology) were mixed and uniformly dispersed (at least 4 hours) in deionized water (22.5 wt % of solid and 77.5 wt % of deionized water), obtaining Negative electrode active layer composition (2).

Example 4

78.7 parts by weight of SiO/C (mixture of silicon oxide and carbon) (commercially available from Kaijin New Energy Technology Co., Ltd. with a trade designation of KYX-2), 12.3 parts by weight of conductive carbon black (with a trade number of Super-P, commercially available from Timcal), 0.7 parts by weight of Polymer (1), 4.5 parts by weight of carboxymethyl cellulose (CMC) (with a trade number of CMC-2200, commercially available from Daicel Chemical industries), and 3.8 parts by weight of styrene-butadiene rubber (SBR) (with a trade number of Nippon A&L 307R, commercially available from Cino Group or S-insight technology) were mixed and uniformly dispersed (at least 4 hours) in deionized water (22.5 wt % of solid and 77.5 wt % of deionized water), obtaining Negative electrode active layer composition (3).

Comparative Example 1

80.7 parts by weight of SiO/C (mixture of silicon oxide and carbon) (commercially available from Kaijin New Energy Technology Co., Ltd. with a trade designation of KYX-2), 12.6 parts by weight of conductive carbon black (with a trade number of Super-P, commercially available from Timcal), and 6.7 parts by weight of polyacrylic acid (PAA) (poly(acrylic acid), PAA) were mixed and uniformly dispersed (at least 4 hours) in deionized water (22.5 wt % of solid and 77.5 wt % of deionized water), obtaining Negative electrode active layer composition (4).

Comparative Example 2

78.9 parts by weight of SiO/C (silicon oxide and carbon mixture) (commercially available from Kaijin New Energy Technology Co., Ltd. with a trade designation of KYX-2), 12.3 parts by weight of conductive carbon black (with a trade number of Super-P, commercially available from Timcal), 5 parts by weight of carboxymethyl cellulose (CMC) (with a trade number of CMC-2200, commercially available from Daicel Chemical industries), and 3.8 parts by weight of styrene-butadiene rubber (SBR) (with a trade number of Nippon A&L 307R, commercially available from Cino Group or S-insight technology) were mixed and uniformly dispersed (at least 4 hours) in deionized water (22.5 wt % of solid and 77.5 wt % of deionized water), obtaining Negative electrode active layer composition (5).

Comparative Example 3

78.9 parts by weight of SiO/C (mixture of silicon oxide and carbon) (commercially available from Kaijin New Energy Technology Co., Ltd. with a trade designation of KYX-2), 12.3 parts by weight of conductive carbon black (with a trade number of Super-P, commercially available from Timcal), 0.5 parts by weight of chitosan (with a molecular weight of about 300,000) (CAS:9012-76-4, commercially available from sigma-aldrich), 4.5 parts by weight of carboxymethyl cellulose (CMC) (with a trade number of CMC-2200, commercially available from Daicel Chemical industries), and 3.8 parts by weight of styrene-butadiene rubber (SBR) (with a trade number of Nippon A&L 307R, commercially available from Cino Group or S-insight technology) were mixed and uniformly dispersed (at least 4 hours) in deionized water (22.5 wt % of solid and 77.5 wt % of deionized water), obtaining Negative electrode active layer composition (6).

Negative Electrode

Example 5

A copper foil (with a trade number of BFR-F, commercially available from Chang Chun Group) (serving as negative electrode current-collecting layer) was provided. Next, Negative electrode active layer composition (1) was coated on the copper foil by blade coating to form a coating. Next, the coating was rolled with a rolling mill with a compression rate of 25% to 30%. Next, after drying at 120° C., Negative electrode (1) having Negative electrode active layer (1) (with a thickness of about 50 μm) was obtained.

The resistivity of Negative electrode active layer (1) was measured using a four-point probe resistance meter (DU-5211 Ohm Meter, Delta United), and the results are shown in Table 1.

The method for determining the resistivity of the negative electrode active layer included following steps. The sample was disposed in the four-point probe resistance meter. The probe was brought into contact with the sample surface under a pressure of 0.08 MPa. After contact, the system was allowed to stand for 3 seconds before measuring the resistivity via the four-point probe resistance meter.

Comparative Example 4

Comparative Example 4 was performed in the same manner as the method for preparing the negative electrode disclosed in Example 5, except that Negative electrode active layer composition (1) was replaced with Negative electrode active layer composition (4), obtaining Negative electrode (2) having Negative electrode active layer (2) (with a thickness about 50 μm).

The resistivity of Negative electrode active layer (2) was measured using a four-point probe resistance meter (DU-5211 Ohm Meter, Delta United), and the results are shown in Table 1.

TABLE 1

|  | Negative electrode active layer (1) | Negative electrode active layer (2) |
|---|---|---|
| composition | Negative electrode active layer composition (1) | Negative electrode active layer composition (4) |
| resistivity (mΩ) | 0.496 | 0.463 |

As shown in Table 1, the resistivity of negative electrode active layer is not greatly changed by adding the polymer of the disclosure into the negative electrode active composition.

Example 6

Example 6 was performed in the same manner as the method for preparing the negative electrode disclosed in Example 5, except that Negative electrode active layer composition (1) was replaced with Negative electrode active layer composition (2), obtaining Negative electrode (3) having Negative electrode active layer (3) (with a thickness about 50 μm).

The adhesivity between Negative electrode active layer (3) and the negative electrode current-collecting layer was measured, and the results are shown in Table 2.

The adhesivity was determined by the 180 degree peeling test according to GB2792-1998 via the tensile testing machine (DS2-20N, IMADA).

Example 7

Example 7 was performed in the same manner as the method for preparing the negative electrode disclosed in Example 5, except that Negative electrode active layer composition (1) was replaced with Negative electrode active layer composition (3), obtaining Negative electrode (4) having Negative electrode active layer (4) (with a thickness about 50 μm).

The adhesivity between Negative electrode active layer (4) and the negative electrode current-collecting layer was measured, and the results are shown in Table 2.

Comparative Example 5

Comparative Example 5 was performed in the same manner as the method for preparing the negative electrode disclosed in Example 5, except that Negative electrode active layer composition (1) was replaced with Negative electrode active layer composition (5), obtaining Negative electrode (5) having Negative electrode active layer (5) (with a thickness about 50 μm).

The adhesivity between Negative electrode active layer (5) and the negative electrode current-collecting layer was measured, and the results are shown in Table 2.

Comparative Example 6

Comparative Example 6 was performed in the same manner as the method for preparing the negative electrode disclosed in Example 5, except that Negative electrode active layer composition (1) was replaced with Negative electrode active layer composition (6), obtaining Negative electrode (6) having Negative electrode active layer (6) (with a thickness about 50 μm).

The adhesivity between Negative electrode active layer (6) and the negative electrode current-collecting layer was measured, and the results are shown in Table 2.

TABLE 2

|  | Negative electrode active layer (3) | Negative electrode active layer (4) | Negative electrode active layer (5) | Negative electrode active layer (6) |
| --- | --- | --- | --- | --- |
| composition | Negative electrode active layer composition (2) | Negative electrode active layer composition (3) | Negative electrode active layer composition (5) | Negative electrode active layer composition (6) |
| adhesivity (Kgw) | 0.241 | 0.517 | 0.156 | 0.150 |

As shown in Table 2, in comparison with Negative electrode active layer (5) obtained in Comparative Example 5, since the composition for preparing Negative electrode active layer (3) of Example 6 further included the polymer of the disclosure (which is able to react with carboxymethyl cellulose (CMC) and active material), the adhesivity between the negative electrode active layer and the negative electrode current-collecting layer is improved. In addition, in comparison with Negative electrode active layer (6) obtained in Comparative Example 6, since chitosan was replaced with chitosan having a lithium sulfonate group, the adhesivity between the negative electrode active layer and the negative electrode current-collecting layer in Example 6 is further improved. Furthermore, in comparison with Example 6, the amount of polymer was increased in the composition of Example 7 so that the adhesivity between the negative electrode active layer and the negative electrode current-collecting layer in Example 7 is further improved.

Performance of Negative Electrode (Half Battery Evaluation)

Example 8

Negative electrode (1) of Example 5, a polypropylene (PP) separator (commercially available from Celgard with a trade number of 2320) (with a thickness about 20 μm), and metallic lithium (6 mm diameter, 1 mm thick) (serving as the opposite electrode) were provided.

Next, the negative electrode, the separator and the positive electrode were placed in sequence (wherein the negative electrode active layer of the negative electrode was oriented toward the separator, and the lithium foil of the positive electrode was oriented toward the separator) and sealed within a coin-type cell (CR2032) (with a size of 3.2 mm (thickness)×20 mm (width)×20 mm (length), and then a liquid electrolyte (commercially available from S-insight technology) was injected into the coin-type cell, obtaining Battery (1).

Next, the charging capacity and discharging capacity in the first charge/discharge cycle of Battery (1) were measured using a potentiostat (commercially available from Biologic under the trade designation of VMP3) under a constant current (0.1 C) at 25° C. to determine the reversible ratio, and the results are shown in Table 3. Next, the capacity retention of Battery (1) was measured, the results are shown in Table 3. The capacity retention was measured by determining the discharge specific capacity at the first charge/discharge cycle and the discharge specific capacity at the 50th charge/discharge cycle at charge rate and discharge rate of 0.2 C/0.2 C at 25° C.

Comparative Example 7

Comparative Example 7 was performed in the same manner as the method for preparing battery of Example 8, except that Negative electrode (1) was replaced with Negative electrode (2), obtaining Battery (2).

Next, the charging capacity and discharging capacity in the first charge/discharge cycle of Battery (2) were measured using a potentiostat (commercially available from Biologic under the trade designation of VMP3) under a constant current (0.1 C) at 25° C. to determine the reversible ratio, and the results are shown in Table 3. Next, the capacity retention of Battery (2) was measured, the results are shown in Table 3.

TABLE 3

|  | Battery (1) | Battery (2) |
| --- | --- | --- |
| negative electrode | Negative electrode (1) | Negative electrode (2) |
| discharge capacity (mAh/g) | 1609.7 | 1595.9 |
| reversible ratio (%) | 28.3 | 28.8 |
| capacity retention (%) (50th charge/discharge cycle) | 52.8 | 27.3 |

As shown in Table 3, when the polymer of the disclosure is further added to the composition of the negative electrode active layer, the discharge capacity of the first charge/discharge cycle of the battery is improved, and the life cycle of the battery is also enhanced.

Example 9

Example 9 was performed in the same manner as the method for preparing battery of Example 8, except that Negative electrode (1) was replaced with Negative electrode (3), obtaining Battery (3).

Next, the charging capacity and discharging capacity in the first charge/discharge cycle of Battery (3) were measured using a potentiostat (commercially available from Biologic under the trade designation of VMP3) under a constant current (0.1 C) at 25° C. to determine the reversible ratio, and the results are shown in Table 4. Next, the capacity retention of Battery (3) was measured, the results are shown in Table 4.

Example 10

Example 10 was performed in the same manner as the method for preparing battery of Example 8, except that Negative electrode (1) was replaced with Negative electrode (4), obtaining Battery (4).

Next, the charging capacity and discharging capacity in the first charge/discharge cycle of Battery (4) were measured using a potentiostat (commercially available from Biologic under the trade designation of VMP3) under a constant current (0.1 C) at 25° C. to determine the reversible ratio, and the results are shown in Table 4. Next, the capacity retention of Battery (4) was measured, the results are shown in Table 4.

Comparative Example 8

Comparative Example 8 was performed in the same manner as the method for preparing battery of Example 8, except that Negative electrode (1) was replaced with Negative electrode (5), obtaining Battery (5).

Next, the charging capacity and discharging capacity in the first charge/discharge cycle of Battery (2) were measured using a potentiostat (commercially available from Biologic under the trade designation of VMP3) under a constant current (0.1 C) at 25° C. to determine the reversible ratio, and the results are shown in Table 4. Next, the capacity retention of Battery (5) was measured, the results are shown in Table 4.

Comparative Example 9

Comparative Example 8 was performed in the same manner as the method for preparing battery of Example 8, except that Negative electrode (1) was replaced with Negative electrode (6), obtaining Battery (6).

Next, the charging capacity and discharging capacity in the first charge/discharge cycle of Battery (6) were measured using a potentiostat (commercially available from Biologic under the trade designation of VMP3) under a constant current (0.1 C) at 25° C. to determine the reversible ratio, and the results are shown in Table 4. Next, the capacity retention of Battery (6) was measured, the results are shown in Table 4.

TABLE 4

| | Battery (3) | Battery (4) | Battery (5) | Battery (6) |
|---|---|---|---|---|
| Negative electrode | Negative electrode (3) | Negative electrode (4) | Negative electrode (5) | Negative electrode (6) |
| discharge capacity (mAh/g) | 1674.1 | 1685.2 | 1552.3 | 1606.1 |
| reversible ratio (%) | 23.1% | 21.8 | 32.7 | 27.2 |
| capacity retention (%) (50th charge/discharge cycle) | 55.8% | 57.5% | 33.1 | 0 |

As shown in Table 4, in comparison with Battery (5) of Comparative Example 8, since the composition for preparing the negative electrode of Example 9 further included the polymer of the disclosure, the discharge capacity of the first charge/discharge cycle is improved, the reversible ratio is reduced, and the life cycle of the battery is increased. In addition, the capacity retention in the 50th charge/discharge cycle of Battery (6) of Comparative Example 9 is almost 0%. In comparison with Comparative Example 9, since chitosan was replaced with chitosan having a lithium sulfonate group to prepare the negative electrode of Example 9, the discharge capacity of the first charge/discharge cycle is improved, the reversible ratio is reduced, and the life cycle of the battery is increased.

According to embodiments of the disclosure, since the polymer of the disclosure has a lithium sulfonate group, the polymer may react with a compound having hydroxyl group or a silicon-containing compound. Due to the addition of the polymer of the disclosure, the composition of the disclosure can form a structure that has lithium replenishment functionality and high mechanical strength, thereby enhancing the efficiency and life cycle of the battery.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A composition, comprising:
Component (A), wherein Component (A) comprises a Polymer (A-1) and carboxymethyl cellulose (A-2), wherein Polymer (A-1) has a repeating unit of -continued wherein R¹ is hydrogen or an acetyl group; and Component (B), wherein Component (B) is a binder, wherein a weight ratio of Component (A) to Component (B) is 1:1 to 1:9.

2. The composition as claimed in claim 1, wherein a weight ratio of Polymer (A-1) to carboxymethyl cellulose (A-2) is 99:1 to 1:19.

3. The composition as claimed in claim 1, wherein the binder is polyvinyl alcohol (PVA), polytetrafluoroethylene (PTFE), polyvinylidene fluoride (PVDF), poly(styrene-co-butadiene), fluorine rubber, polyurethane, polyvinylpyrrolidone, polyvinyl carbonate, polyvinyl chloride, polyacrylonitrile (PAN), polybutadiene, poly(acrylic acid) (PAA), perfluoroalkoxy alkane (PFA), fluorinated ethylene propylene (FEP), polyvinylidene fluoride-co-hexafluoropropylene (PVDF-HFP), styrene-butadiene rubber (SBR), acrylic resin, polyethylene glycol (PEG), poly(ethylene oxide) (PEO), or a combination thereof.

4. The composition as claimed in claim 1, further comprising:

Component (C), wherein Component (C) is a negative electrode active material.

5. The composition as claimed in claim 4, wherein Component (C) is a carbon material, lithium, transition metal oxide, lithium-containing compound, silicon-containing material, or a combination thereof.

6. The composition as claimed in claim 4, wherein a ratio of a total weight of Component (A) and Component (B) to a weight of Component (C) is 1:5 to 1:15.

7. The composition as claimed in claim 1, further comprising:

Component (D), wherein Component (D) is a conductive material.

8. The composition as claimed in claim 7, wherein Component (D) is conductive carbon black, conductive graphite, fluorocarbon, reduced graphene, nitrogen-doped graphite, nitrogen-doped graphene, carbon fiber, carbon nanotube, or a combination thereof.

9. The composition as claimed in claim 7, wherein a ratio of a total weight of Component (A) and Component (B) to a weight of Component (D) is 1:1 to 1:9.

10. A negative electrode, comprising:

a negative electrode active layer, wherein the negative electrode active layer is prepared from the composition as claimed in claim 4.

11. The negative electrode as claimed in claim 10, wherein the negative electrode comprises a negative electrode current-collecting layer, wherein the negative electrode active layer is disposed on the negative electrode current-collecting layer.

12. A battery, comprising:

the negative electrode as claimed in claim 10;
a separator; and
a positive electrode, wherein the negative electrode is separated from the positive electrode via the separator.

13. The battery as claimed in claim 12, wherein the separator is polyethylene (PE), polypropylene (PP), polytetrafluoroethylene (PTFE), polyamide, polyvinylchloride (PVC), poly(vinylidene fluoride), polyaniline, polyimide, polyethylene terephthalate, polystyrene (PS), ceramic material, or a combination thereof.

14. The battery as claimed in claim 12, further comprising:

a liquid electrolyte disposed between the positive electrode and the negative electrode.

15. The battery as claimed in claim 12, wherein the positive electrode comprises a positive electrode active layer.

16. The battery as claimed in claim 15, wherein the positive electrode active layer comprises a positive electrode active material, wherein the positive electrode active material is sulfur, organic sulfide, sulfur carbon composite, metal-containing lithium oxide, metal-containing lithium sulfide, metal-containing lithium selenide, metal-containing lithium telluride, metal-containing lithium silicide, metal-containing lithium boride, or a combination thereof, wherein the metal is selected from a group consisting of aluminum, vanadium, titanium, chromium, copper, molybdenum, niobium, iron, nickel, cobalt, and manganese.

* * * * *